UNITED STATES PATENT OFFICE.

CLAUDE ELMER PRICE, OF SPOKANE, WASHINGTON.

CONFECTIONERY.

1,236,380. Specification of Letters Patent. Patented Aug. 7, 1917.

No Drawing. Application filed March 26, 1917. Serial No. 157,553.

*To all whom it may concern:*

Be it known that I, CLAUDE ELMER PRICE, a citizen of the United States, residing at Spokane, in the county of Spokane and State of Washington, have invented certain new and useful Improvements in Confectionery, of which the following is a specification.

This invention relates to improvements in confectionery and more particularly bon-bons, and has for its objects the production of bon-bons provided with a substantially air-tight or impervious coating, so that their interior parts will not dry out and they may be kept for a considerable time in a fresh and moist condition with preservation of flavor. My invention is particularly applicable to what are known as cream bon-bons, which are provided with soft and creamy interior parts and which, as heretofore made, have been provided with ordinary sugar coatings. These bon-bons as thus heretofore made dry out so quickly that their manufacture and marketing on a large scale has been impracticable, and they have only been produced by the small confectioners who sell directly to the consumers. According to my invention cream bon-bons are provided with an air-tight or impervious coating and will keep for a long time and may thus be marketed on a large scale, with a considerable interval of time between manufacture and consumption.

In the manufacture of bon-bons embodying my invention an oily or fatty material, hereinafter referred to as a fat, such as pure cocoa butter, is mixed with sugar and the mixture brought to a practical dipping texture, and the prepared interior parts of the bon-bons suitably coated thereby, as by the ordinary dipping procedure.

I have also found that the addition of milk to the mixture improves the coating, and have used the milk in a dry or powdered form. Such a coating is practically impervious and the bon-bon will remain fresh and palatable, with preservation of flavor, for a long period of time.

The following is the formula which has given the best results in practice: 35 parts of pure cocoa butter, 50 parts of sugar, and 10 parts of dry milk, the proportions being by weight. This mixture is milled in chocolate mélangeurs and chocolate refiners to a dipping texture, and is applied as a coating to the prepared interior parts. It forms a substantially white coating and the completed bon-bons resemble the ordinary sugar coated or all sugar bon-bons in appearance, but with the advantage that they will keep in fresh condition, preserving their moisture and flavor for a long period of time. It may also be noted that the coating imparts a flavor to the confection which is highly acceptable, so that my new bon-bons are in fact a new confection.

It is obvious that the coatings above described may be varied in composition and manufacture within the scope of my invention.

I claim:

1. A bon-bon coated with a mixture of fat and sugar.

2. A bon-bon coated with a mixture of fat, sugar and milk.

3. A bon-bon coated with a mixture of cocoa butter and sugar.

4. A bon-bon coated with a mixture of cocoa butter, sugar and milk.

5. A bon-bon coated with a mixture of cocoa butter 35 parts, sugar 50 parts, and dry milk 10 parts, substantially as described.

In testimony whereof I have affixed my signature.

CLAUDE ELMER PRICE.